US008873858B2

(12) United States Patent
Yuan

(10) Patent No.: US 8,873,858 B2
(45) Date of Patent: Oct. 28, 2014

(54) APPARATUS, METHOD, DEVICE AND COMPUTER PROGRAM PRODUCT PROVIDING ENHANCED TEXT COPY CAPABILITY WITH TOUCH INPUT DISPLAY

(75) Inventor: Shijun Yuan, Beijing (CN)

(73) Assignee: RPX Corporation, San Francisco, CA (US)

( * ) Notice: Subject to any disclaimer, the term of this patent is extended or adjusted under 35 U.S.C. 154(b) by 2585 days.

(21) Appl. No.: 11/478,710

(22) Filed: Jun. 29, 2006

(65) Prior Publication Data
US 2008/0002888 A1 Jan. 3, 2008

(51) Int. Cl.
G06K 9/00 (2006.01)
G06F 3/0488 (2013.01)

(52) U.S. Cl.
CPC .................................. *G06F 3/0488* (2013.01)
USPC ............ 382/189; 382/188; 382/314; 382/315

(58) Field of Classification Search
USPC .................. 382/187, 188, 189, 313, 314, 315
See application file for complete search history.

(56) References Cited

U.S. PATENT DOCUMENTS

| | | | | |
|---|---|---|---|---|
| 5,404,442 A | | 4/1995 | Foster et al. ................... | 395/159 |
| 5,760,773 A | | 6/1998 | Berman et al. ................. | 345/347 |
| 6,212,297 B1 | * | 4/2001 | Sklarew ......................... | 382/189 |
| 6,331,840 B1 | | 12/2001 | Nielson et al. ................. | 345/1.1 |
| 6,563,494 B1 | * | 5/2003 | Eichstaedt et al. ............. | 345/179 |
| 7,009,663 B2 | | 3/2006 | Abileah et al. ................. | 349/12 |
| 7,053,967 B2 | | 5/2006 | Abileah et al. ................. | 349/12 |
| 7,503,012 B2 | * | 3/2009 | Chen et al. ..................... | 715/769 |
| 2003/0014382 A1 | | 1/2003 | Iwamoto et al. ................. | 707/1 |
| 2003/0090520 A1 | * | 5/2003 | Niittynen ....................... | 345/764 |
| 2004/0250215 A1 | | 12/2004 | Chen et al. ..................... | 715/769 |
| 2004/0252108 A1 | * | 12/2004 | Xuan et al. ..................... | 345/173 |
| 2005/0004986 A1 | * | 1/2005 | Aoki et al. ..................... | 709/206 |
| 2005/0066335 A1 | * | 3/2005 | Aarts ............................. | 719/316 |
| 2005/0102630 A1 | | 5/2005 | Chen et al. ..................... | 715/770 |
| 2005/0155017 A1 | * | 7/2005 | Berstis et al. ................... | 717/114 |
| 2005/0243373 A1 | * | 11/2005 | Silverbrook et al. ........ | 358/1.18 |
| 2005/0270274 A1 | * | 12/2005 | Bachmann ..................... | 345/173 |
| 2006/0218492 A1 | * | 9/2006 | Andrade ........................ | 715/523 |
| 2007/0192742 A1 | * | 8/2007 | Lee et al. ....................... | 715/828 |
| 2007/0226713 A1 | * | 9/2007 | McGowan et al. ........... | 717/147 |

FOREIGN PATENT DOCUMENTS

| | | | |
|---|---|---|---|
| EP | 785 507 A1 | 7/1997 | |
| EP | 0 851 349 A2 | 7/1998 | |
| EP | 1840707 A1 | * 10/2007 | |

* cited by examiner

*Primary Examiner* — Gregory M Desire
(74) *Attorney, Agent, or Firm* — Howison & Arnott, LLP

(57) ABSTRACT

A device includes a display having touch sensitive display surface that is responsive to pen-based user input, and a control unit that is bidirectionally coupled to the display. The control unit is responsive to a user selecting displayed text from a first display location using the pen, and is further responsive to a first signal generated using the pen, to copy the selected displayed text to a buffer associated with a text window and to display the copied text in the text window. The control unit is further responsive to the user selecting a second display location using the pen, and to a second signal, to copy the displayed text from the text window to the second display location, thereby implementing a copy and paste function. A cut and paste function may also be implemented.

33 Claims, 4 Drawing Sheets

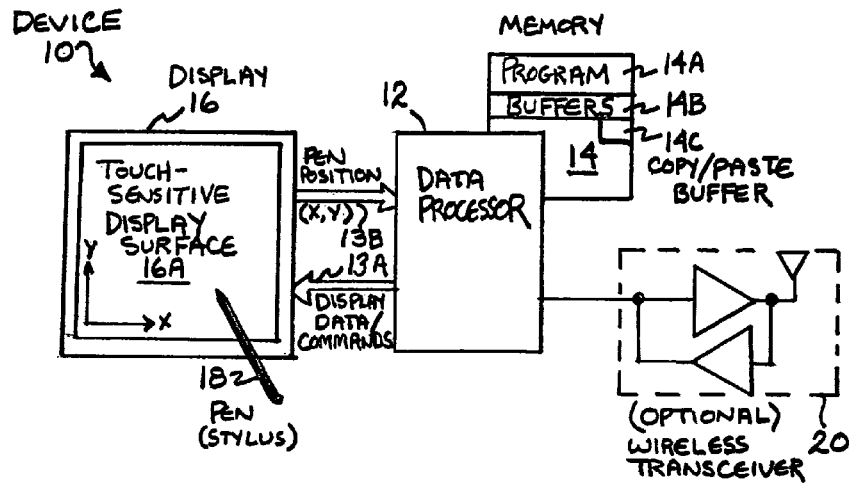
Figure 1
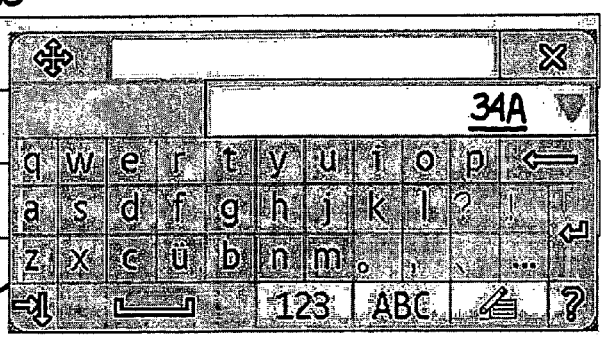
Figure 2A
Figure 2B

APPARATUS, METHOD, DEVICE AND COMPUTER PROGRAM PRODUCT PROVIDING ENHANCED TEXT COPY CAPABILITY WITH TOUCH INPUT DISPLAY

TECHNICAL FIELD

The teachings in accordance with the exemplary embodiments of this invention relate generally to apparatus, methods and computer program products that provide a graphical user interface and, more specifically, relate to text input and manipulation techniques for use with touch sensitive display devices.

BACKGROUND

On a device with a touch screen, selecting some text is easy to accomplish with a pen (also referred to as a stylus). However, to copy the selected text to another location typically requires the user to access a menu twice: the first time for selecting a Copy command, and second time for selecting a Paste command. This can become a tedious activity that reduces the user's efficiency and his general satisfaction with the text editing/manipulation application.

It is known that a Copy button and a Paste button can be provided on a toolbar in some cases to facilitate access to these commands. However, the presence of these buttons cannot be guaranteed for all possible platforms and applications. Furthermore, in the case of relatively small handheld devices, wherein display screen area is physically constrained (e.g., such as in cellular telephone and personal digital assistant (PDA) types of handheld devices), the provision of Copy and Paste control buttons would reduce the amount of screen area that is available to applications.

In a device that has a full keyboard the copy and paste operations may be accomplished using shortcut keys. However, not all users have knowledge of shortcut keys. Furthermore, if using shortcut keys while inputting with a pen the user may be required to shift his focus between the keyboard and the writing tablet/touch screen, which can result in reduced efficiency and an increased probability of making an erroneous input.

SUMMARY OF THE EXEMPLARY EMBODIMENTS

The foregoing and other problems are overcome, and other advantages are realized, in accordance with the non-limiting and exemplary embodiments of this invention.

In accordance with exemplary embodiments of this invention there is provided a method, and a computer program product, that include selecting displayed text from a first display location using a pen in combination with a touch sensitive surface; in response to a first signal generated using the pen, copying the selected displayed text to a buffer associated with a text window and displaying the copied text in the text window; selecting a second display location using the pen and in response to a second signal, copying the displayed text from the buffer to the second display location.

In accordance with additional exemplary embodiments of this invention there is provided a device that includes a display having touch sensitive display surface that is responsive to pen-based user input, and a control unit that is bidirectionally coupled to the display. The control unit is responsive to a user selecting displayed text from a first display location using the pen, and is further responsive to a first signal generated using the pen, to copy the selected displayed text to a buffer associated with a text window and to display the copied text in the text window. The control unit is further responsive to the user selecting a second display location using the pen, and to a second signal, to copy the displayed text from the buffer to the second display location.

In accordance with further additional exemplary embodiments of this invention there is provided a wireless communications device having touch sensitive display means comprising a touch sensitive display surface for receiving pen-based input from a user and for displaying information to the user, and control means bidirectionally coupled to the display means for implementing a cut/copy-and-paste text function. The control means is responsive to a user selecting displayed text from a first display means location using the pen, and is further responsive to a first signal generated using the pen, for copying the selected displayed text to a buffer associated with a text window and for displaying the copied text in the text window. The control means is being further responsive to the user selecting a second display location using the pen, and to a second signal, for pasting the displayed text from the buffer to the second display location.

In the various exemplary embodiments of this invention the first display location may be associated with a first application, and the second display location may be associated with a second application, and the text window may be associated with an application that differs from at least one of the first and second applications. Both copy and paste, and cut and paste, operations may be implemented.

BRIEF DESCRIPTION OF THE DRAWINGS

The foregoing and other aspects of the teachings of this invention are made more evident in the following Detailed Description, when read in conjunction with the attached Drawing Figures, wherein:

FIG. 1 is a simplified block diagram of a device that is suitable for use with the exemplary embodiments of this invention.

FIGS. 2A through 2E depict an exemplary use of the touch-sensitive display surface and pen of FIG. 1 in accordance with the non-limiting embodiments of this invention.

DETAILED DESCRIPTION

Figure 2C:
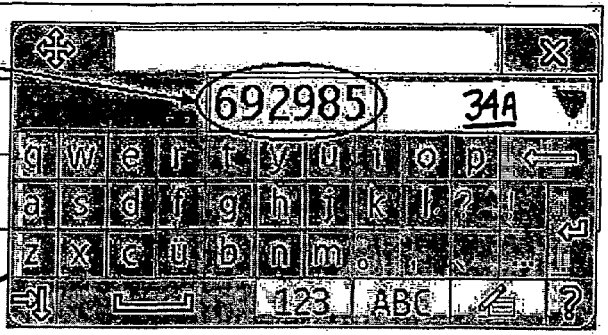

As will be explained in detail below, the use of the exemplary embodiments of this invention facilitate a text cut/copy and paste operation with a device having a touch sensitive input component, such as an input component used with a pen. The touch sensitive input component may be incorporated into a display component (e.g., as a touchscreen-type of component), or it may be a component separate from the display component, for example, a tablet-type of input component that is used in combination with a separate display component, such as an LCD, CRT, plasma or other type of display component.

Reference is made first to FIG. 1 for illustrating a simplified block diagram of a device 10 that is suitable for use with the exemplary embodiments of this invention. The device 10 is assumed to include at least one data processor (DP) 12 that coupled to at least one memory 14. The DP 12 is also coupled to a display 16 which may have a touch sensitive display surface 16A used in conjunction with a pen 18 (which may be referred to as a stylus). Note that the pen 18 may be replaced by the user's fingertip in some cases, typically depending on the size (usable area) of the touch-sensitive display surface 16A. A data path 13A exists between the DP 12 and the display 16 to enable the DP 12 to send commands and data, including data to be displayed, to the display 16. Also shown is a data path 13B whereby the display 16 sends the DP 12 information that is descriptive of a location of the tip of the pen 18 on the touch-sensitive display surface 16A. This information may be expressive of x-y coordinates referenced to the touch-sensitive display surface 16A, or in any desired coordinates or format. Note that the data paths 13A, 13B may be incorporated into a single data path or bus, such as a serial or parallel bus, that interfaces the DP 12 to the display 16. Also shown in FIG. 1 is an optional wireless transceiver 20 that can be present in those device 10 embodiments that provide some type of communication capabilities for the user. Non-limiting examples of wireless transceivers include cellular and PCS band radio frequency (RF) transceivers, Bluetooth™ transceivers, WiMAX transceivers as well as various wireless local area network (WLAN) transceivers. Note that the wireless transceiver maybe based on RF or optical technology, and note further that in some devices there may be a plurality of wireless transceivers 20 present (e.g., both cellular RF and Bluetooth™ wireless transceivers, or cellular RF and WLAN wireless transceivers).

The memory 14 is assumed to store a program 14A that is executed by the DP 12 during operation of the device 10. The program 14A may include, as two non-limiting examples, an operating system (OS) and one or more user application programs (e.g., a text editor program). At least a portion of the program 14A is assumed to include program instructions that when executed by the DP 12 result in the implementation of the exemplary embodiments of this invention, as will be discussed below in conjunction with FIGS. 2A-2E. Note that a plurality of buffers 14B are also typically present in some read/write portion of the memory 14. Certain of these buffers 14B may be used as text buffers by the program 14A when operating in accordance with the exemplary embodiments of this invention.

In general, the various embodiments of the device 10 can include, but are not limited to, cellular telephones and other wireless communication appliances, personal digital assistants (PDAs), portable and desktop computers, image capture devices such as digital cameras, gaming devices, music storage and playback appliances, Internet and local area network (LAN) appliances permitting access and possibly browsing, as well as portable units or devices that incorporate combinations of such functions.

In general, the exemplary embodiments of this invention may be implemented by computer software executable by the DP 10, or by hardware, or by a combination of software and hardware.

The memory 14 may be of any type suitable to the local technical environment and may be implemented using any suitable data storage technology, such as semiconductor-based memory devices, magnetic memory devices and systems, optical memory devices and systems, fixed memory and removable memory. For the purposes of this invention the memory 14 may be considered to be a computer readable medium. The DP 10, or more generally the computer or controller or control unit, may be of any type suitable to the local technical environment, and may include one or more of general purpose computers, special purpose computers, microprocessors, digital signal processors (DSPs) and processors based on a multi-core processor architecture, as non-limiting examples.

As employed herein the pen 18 may be embodied as any type of user manipulated physical object, including the user's fingertip. As employed herein, the touch-sensitive display surface 16A of the display 16 may be implemented using any suitable technology, including resistive/capacitive-based touch sensors, acoustic-based touch sensors and optically-based sensors. In general, a sensor-based input device can be based on mechanical movement of different materials, a change of electrical conductivity/capacity, influences by electrostatic field or optical properties (e.g., made by finger shadow/reflection from the surface). One suitable but non-limiting type of touch-sensitive display is known an Active Matrix LCD (AMLCD), such as one described in U.S. Pat. No. 7,009,663 B2 (Mar. 7, 2006), entitled "Integrated Optical Light Sensitive Active Matrix Liquid Crystal display", A. Abileah et al., and U.S. Pat. No. 7,053,967 B2 (May 30, 2006), entitled "Light Sensitive Display", A. Abileah et al. Reference is now made to FIGS. 2A through 2E that depict an exemplary use of the touch-sensitive display surface 16A and pen 18 of FIG. 1 in accordance with the non-limiting embodiments of this invention.

FIG. 2A depicts an initial condition, wherein there is some text (in this case a numeric string '692985') displayed in a 'source editor' 30. The goal is copy (paste) the text to a 'target editor' 32 (shown as being empty in this non-limiting example). Note that the source editor 30 and the target editor 32 may actually be one and the same editor (e.g., an application capable of handling and manipulating text).

As employed herein 'text' is intended to be broadly construed as encompassing any symbology capable of being displayed to a user including, but not limited to, alphanumeric characters and symbols, phonetic symbols, typographic symbols, iconic symbols and mathematical and scientific symbols. Text may be expressed in, or may represent components of, any language, writing and alphabet convention including, but not limited to, Roman, Chinese, Kanji, Vedic, Arabic, Cyrillic, Greek and Hebrew.

The original content in the source editor 30 may be derived from any source including, but not limited to, manual user entry, a text-containing file read from the memory 14 and/or a text-containing message or communication received through the wireless transceiver 20.

In FIG. 2B the user employs the pen 18 to select and highlight some or all of the text displayed in the source editor 30 that is desired to be copied to the target editor 32. FIG. 2B also shows a virtual keyboard (VKB) 34 that has been displayed on the touch-sensitive display screen surface 16A. The VKB 34 includes at least one region of the display, referred to for convenience and not by way of limitation as a window 34A, that is capable of containing and displaying text, such as a window used for displaying pen 18 input when touching virtual keys (e.g., qwerty keys) during use of a VKB application, or a window used for displaying a result of handwriting recognition (HWR) software that operates on a user's pen input on the touch-sensitive display screen surface 16A during use of the HWR application. As one non-limiting example, the window 34A may be used for displaying candidate Chinese text characters obtained as a result of the operation of a pen-based HWR application that forms a part of the program 14A.

Note that the window 34A may be one whose primary function is other than that of supporting the copy/paste functionality provided by the exemplary embodiments of this invention. The window 34A may be considered to be a 'borrowed' or a 're-used' window, i.e., one that is borrowed or re-used by the copy/paste application from another application (e.g., from a HWR application).

In FIG. 2C there is shown the result of the user lifting the tip of the pen 18 from the touch-sensitive display screen surface 16A. More specifically, the program 14B senses the pen lift event from an input received from the display 16 and retrieves the highlighted text (the numeric string '692985' in this case) from the source editor 30, stores the retrieved text in a text buffer 14B, which may be referred to herein as a copy/paste buffer 14C (as shown in FIG. 1), and displays the retrieved text in the window 34A of the VKB 34. This may be considered to be a copy function.

In this embodiment the window 34A can be employed for this purpose as it may be assumed that it is not currently in use for its normal purpose(s). However, even if there were pre-existing text in the window 34A the text copied from the source editor 30 may simply be (temporarily) appended to the end of the pre-existing text so that it may be displayed to the user. In this case the newly displayed copied text may be visually highlighted in some way (such as with color) and/or the display of the pre-existing text may be (temporarily) de-emphasized in some way (e.g., by muting its color, or by changing a black or color text display to a gray text display). The text copied from the source editor 30 may also simply overwrite any text in the buffer/window 34A.

Note that the lifting of the tip of the pen 18 for generating the signaling event to the program 14A is but one suitable technique. For example, in another exemplary embodiment the user may simply drag the pen tip across the text to be selected, and then tap the tip of the pen 18 once or twice on the touch-sensitive display screen surface 16A to signal the program 14A to initiate the copy operation.

Figure 2D:
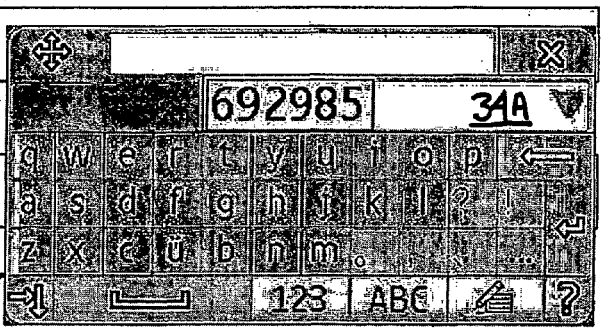

Referring to FIG. 2D, the user moves the pen 18 to the desired location in the target editor 32 where the copied text is to be pasted, and signals same to the program 14A by some appropriate action, such as by touching the touch-sensitive display screen surface 16A one or more times at the desired location.

Figure 2E:
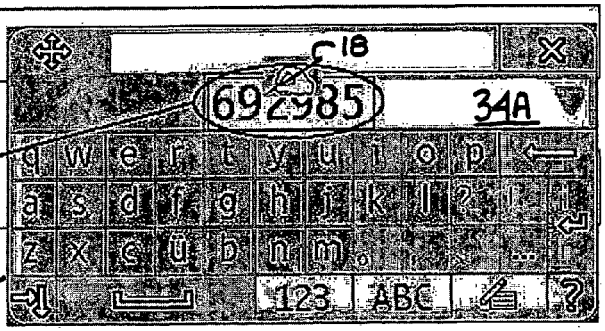

In FIG. 2E the user taps or otherwise indicates the copied text in the window 34A, and in response the program 14A copies the corresponding text previously saved in the copy/paste buffer 14C to the indicated location in the target editor 32, thereby executing a paste operation. In practice, the content of the copy-paste buffer 14C may be copied to a text buffer associated with the target editor 32.

Other techniques may be used to generate a signal as opposed to tapping, such as tactile feedback.

Based on the description of FIGS. 2A-2E it can be appreciated that the exemplary embodiments of this invention enable the user to efficiently execute a copy/paste function that does not require the user to access to a menu (such as a pop-up or pull-down menu) of commands/functions, and that furthermore does not require the display of any dedicated buttons, icons or other controls on the display 16.

Figure 4:
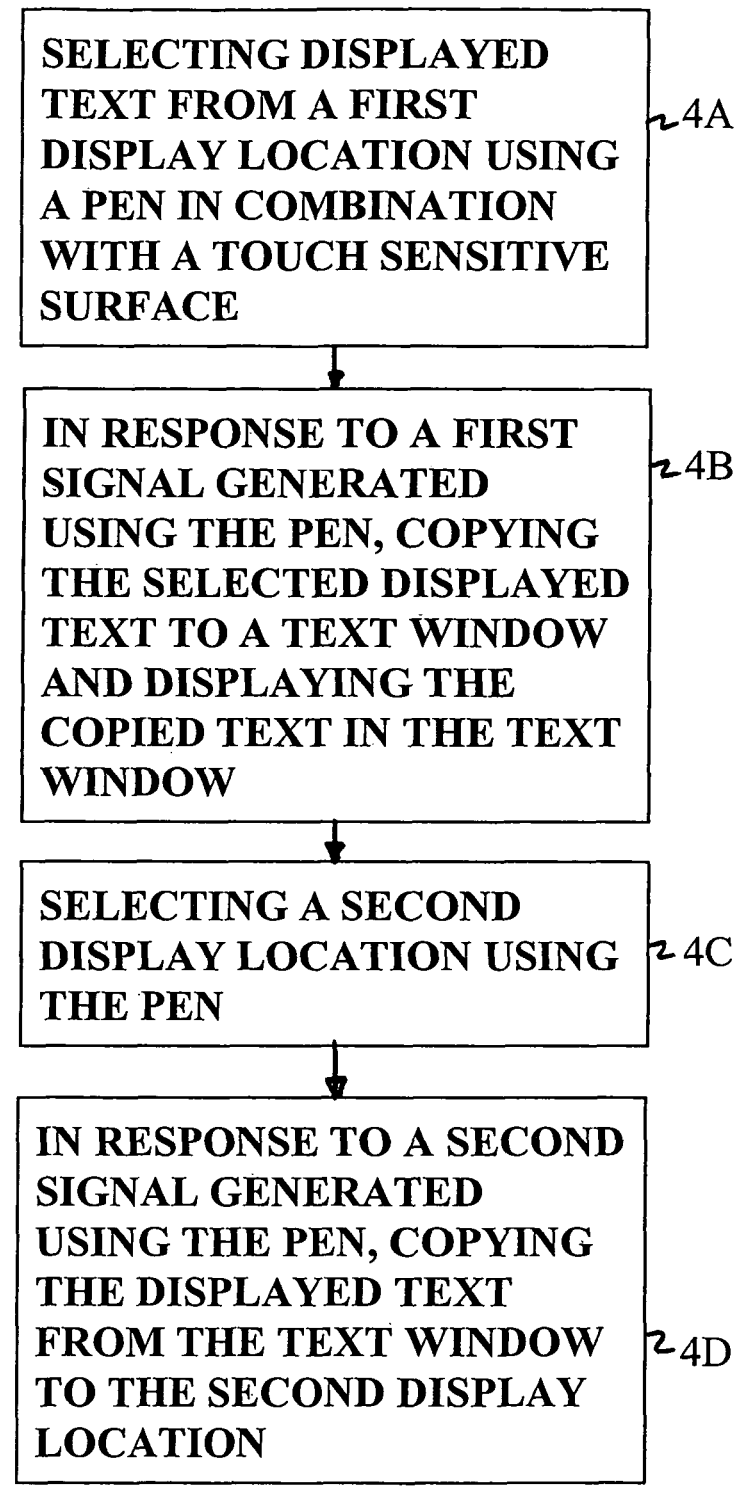
FIG. 4 is a logic flow diagram that shows a method in accordance with exemplary embodiments of this invention.

In accordance with a method (and a computer program product) that are aspects of the exemplary embodiments of this invention, and referring to FIG. 4, the following steps/procedures/operations are executed: (Block A) selecting displayed text from a first display location using the pen in combination with the touch sensitive surface; (Block B) in response to a first signal generated using the pen, copying the selected displayed text to a text window and displaying the copied text in the text window; (Block C) selecting a second display location using the pen; and (Block D) in response to a second signal, such as one generated using the pen, or by some other technique, such as activating two or more VKB buttons (e.g., shift+arrow keys), copying the displayed text from the text window to the second display location.

Note that the copy/paste feature just described may complement an already existing conventional copy/paste function, as opposed to replacing it. Thus, it may be desirable that the copy/paste feature in accordance with the exemplary embodiments of this invention use its own (dedicated) copy/paste buffer 14C, and other memory locations as needed, so as not to interfere with operation of an already existing copy/paste function (i.e., so that it does not modify or affect in any way the content of a clipboard where other text may be already saved). However, when the user uses the conventional copy command to place some text on the clipboard, the same text may be displayed in the window 34A as well.

Note further that once text is stored in the copy/paste buffer 14C and displayed in the window 34A that the operations shown in FIGS. 2D and 2E may be repeated two or more times, enabling the user the paste the same text string to multiple locations in the target editor 32.

Note further that multiple text strings from the source editor 30 may be placed in the window 34A (and in one or more instances of the copy/past buffer 14C), such as by executing the operations shown in FIGS. 2B and 2C multiple times in succession. The resulting copied text strings can then be individually (or collectively) pasted to one or more locations in the target editor 32. Note that individual ones of the multiple input strings of text to window 34A may come from the same text source or from different text source locations, and also that individual ones of the text strings copied from the source window 34A may go to the same text target or to different text target locations.

Note further still that once the desired text is placed in the window 34A that it may be edited there using, for example, one or more of the virtual keys of the VKB 34. For example, the backspace key may be used to delete one or more displayed text characters from the end of the displayed text in window 34A, and/or one or more of the alphabetic or numeric keys may be used to enter one or more new characters in place of the deleted characters, prior to the text string being pasted into the target editor 32.

Note also that a cut and paste type operation may be provided. For example, in FIG. 2E the original text from the source screen 30 may be erased when copied from the window 34A to the target editor 32, such as by providing a specific signal. For example, one tap of the pen 18 in the window 34A may indicate a copy/paste operation, while two taps may indicate a cut/paste operation.

In implementing the copy/paste feature described in FIGS. 2A-2E it may be desirable that the (program associated with) pen input window 34A monitor the activities of the source editor 30. When a text selection activity is detected (FIG. 2B), the pen input window 34A retrieves the selected text from the source editor 30. The retrieved text is then stored in the copy/paste buffer 14C, displayed in a text box in the pen input window 34A, as shown in FIG. 2C, and in response to input from the user (e.g., tapping the text box in the window 34A), the retrieved text is inserted into the target editor 32 (as in FIG. 2E) at the insertion point indicated by the user in FIG. 2D.

Figure 3:
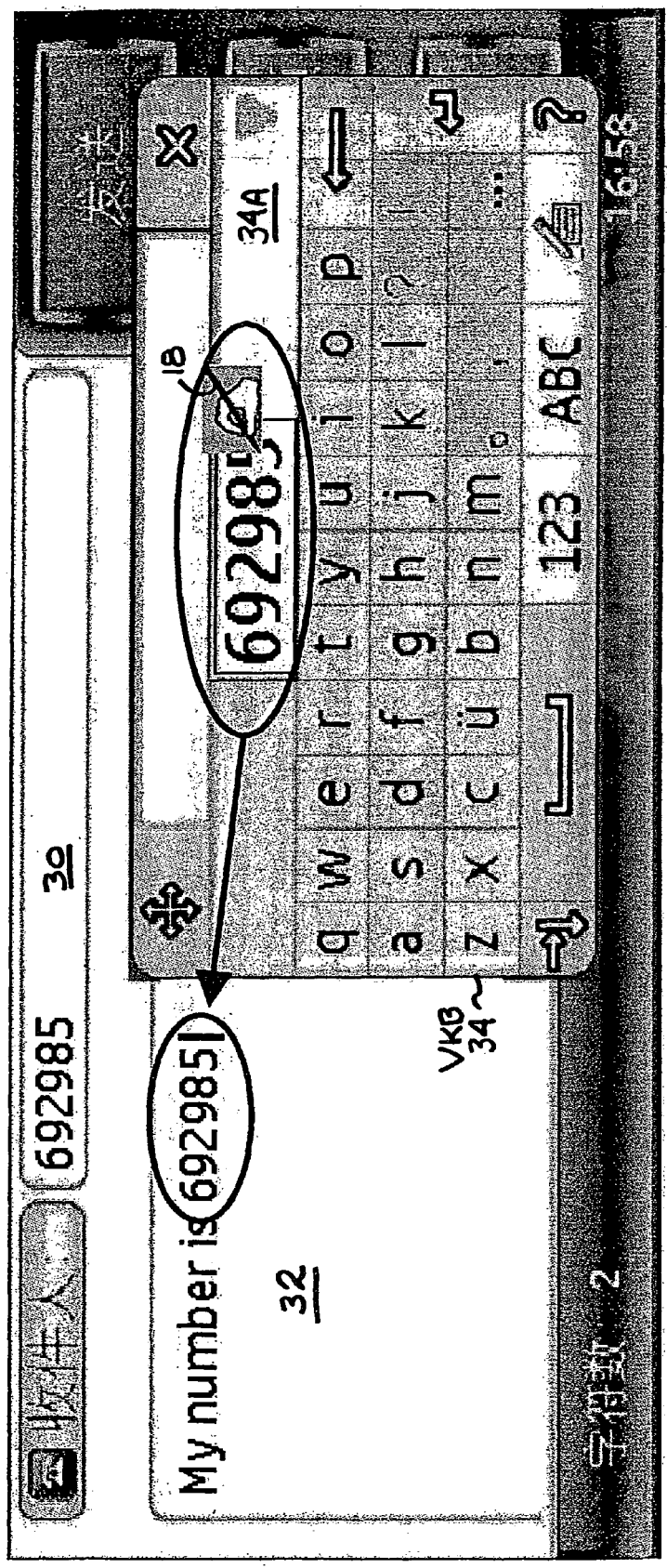
FIG. 3 shows an example of the use of the procedure depicted in FIGS. 2A-2E in an exemplary Chinese language touch screen user interface embodiment.

FIG. 3 shows an example of the use of the procedure depicted in FIGS. 2A-2E in an exemplary Chinese language touch screen user interface (UI) 40 embodiment. In the UI 40 the source editor 30 may be one associated with a phone number input function, the window 34A may be one normally associated with a pen-based virtual keyboard interface function, and the target editor 32 may be one associated with, for example, a message composition editor function used for texting, or with an editor associated with a phone book-type of application. In the example shown in FIG. 3 the text string '692985' has been selected and copied from the source editor 30 (as in FIGS. 2B, 2C), a location in the message composition editor (or phone book editor) function has been selected (the location following an already entered text string 'My number is'), and the text from the window 34A is then copied (pasted) to the selected location (as in FIG. 2E).

It should be appreciated that the use of exemplary embodiments of this invention provide a number of advantages. For example, copying can be performed automatically when the user selects text, and the pasting operation is facilitated since the user is not required to find and activate a paste command in a menu.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations may become apparent to those skilled in the relevant arts in view of the foregoing description, when read in conjunction with the accompanying drawings and the appended claims. As but some examples, the use of other touch-sensitive display components, pen components, UI layout and content, and applications (e.g., other than VKB and/or HWR applications) may be attempted by those skilled in the art. However, all such and similar modifications of the teachings of this invention will still fall within the scope of the exemplary embodiments of this invention.

Furthermore, some of the features of the examples of this invention may be used to advantage without the corresponding use of other features. As such, the foregoing description should be considered as merely illustrative of the principles, teachings, examples and exemplary embodiments of this invention, and not in limitation thereof.

What is claimed is:

1. A method, comprising:
    selecting displayed text from a first display location using a pen in combination with a touch sensitive surface;
    in response to a first signal generated using the pen, copying the selected displayed text to a buffer associated with a text window and displaying the copied text in the text window, where the text window is associated with a handwriting recognition application;
    selecting a second display location using the pen; and
    in response to a second signal, copying the displayed text from the buffer to the second display location.

2. The method of claim 1, where the first display location is associated with a first application, and where the second display location is associated with a second application.

3. The method of claim 2, where the text window is associated with an application that differs from at least one of the first and the second applications.

4. The method of claim 3, where the text window is associated with a virtual keyboard application.

5. The method of claim 2, where the first location is associated with an application that displays a list of candidate Chinese characters.

6. The method of claim 1, further comprising changing the text displayed in the text window prior to copying the displayed text from the buffer to the second display location.

7. The method of claim 1, further comprising removing the selected displayed text from the first display location so as to implement a cut-and-paste function.

8. The method of claim 1, executed in a handheld portable device.

9. The method of claim 1, executed in a handheld wireless communications device, in which the first signal is generated automatically when the pen is lifted from the touch sensitive surface after the displayed text is selected.

10. A non-transitory, computer readable memory comprising computer program instructions, execution of the computer program instructions by a computer resulting in operations that comprise:
    selecting displayed text from a first display location using a pen in combination with a touch sensitive surface;
    in response to a first signal generated using the pen, copying the selected displayed text to a buffer associated with a text window and displaying the copied text in the text window;
    selecting a second display location using the pen;
    in response to a second signal, copying the displayed text from the buffer to the second display location; and
    changing the text displayed in the text window prior to copying the displayed text from the buffer to the second display location.

11. The non-transitory, computer readable memory of claim 10, where the first display location is associated with a first application, and where the second display location is associated with a second application.

12. The non-transitory, computer program readable memory of claim 11, where the text window is associated with an application that differs from at least one of the first and the second applications.

13. The non-transitory, computer program memory of claim 12, where the text window is associated with a virtual keyboard application.

14. The non-transitory, computer program readable memory of claim 12, where the text window is associated with a handwriting recognition application.

15. The non-transitory, computer program readable memory of claim 11, where the first location is associated with an application that displays a list of candidate Chinese characters.

16. The non-transitory, computer readable memory of claim 10, further comprising removing the selected displayed text from the first display location so as to implement a cut-and-paste function.

17. The non-transitory, computer readable memory of claim 10, executed in a handheld portable device.

18. The non-transitory, computer readable memory of claim 10, executed in a handheld wireless communications device, in which the first signal is generated automatically when the pen is lifted from the touch sensitive surface after the displayed text is selected.

19. An apparatus, comprising:
   a display having touch sensitive display surface that is responsive to pen-based user input;
   a control unit that is bidirectionally coupled to the display and responsive to a user selecting displayed text from a first display location using the pen, and further responsive to a first signal generated using the pen, to copy the selected displayed text to a text window and to display the copied text in the text window said control unit further responsive to the user selecting a second display location using the pen, and to a second signal, to copy the displayed text from the text window to the second display location; and
   a wireless transceiver, in which the first signal is generated automatically when the pen is lifted from the touch sensitive surface after the displayed text is selected.

20. The apparatus of claim 19, where the first display location is associated with a first application, and where the second display location is associated with a second application.

21. The apparatus of claim 20, where the text window is associated with an application that differs from at least one of the first and the second applications.

22. The apparatus of claim 21, where the text window is associated with a virtual keyboard function.

23. The apparatus of claim 21, where the text window is associated with a handwriting recognition function.

24. The apparatus of claim 20, where the first location is associated with an application that displays a list of candidate Chinese characters.

25. The apparatus of claim 19, said control unit further changing, in response to user input, the text displayed in the text window prior to copying the displayed text from the buffer to the second display location.

26. The apparatus of claim 19, said control unit further removing the selected displayed text from the first display location so as to implement a cut-and-paste function.

27. The apparatus of claim 19, where the device is a handheld portable device.

28. A wireless communications device, comprising:
   touch sensitive display means comprising a touch sensitive display surface for receiving pen-based input from a user and for displaying information to the user; and
   control means bidirectionally coupled to the display means for implementing a cut-and-paste text function, said control means being responsive to a user selecting displayed text from a first display means location using the pen, and further responsive to a first signal generated using the pen, for copying the selected displayed text to a text window, where the text window is associated with a handwriting recognition application and for displaying the copied text in the text window, said control means being further responsive to the user selecting a second display location using the pen, and to a second signal, for pasting the displayed text from the text window to the second display location.

29. The wireless communications device of claim 28, where the first display location is associated with a first application, and where the second display location is associated with a second application.

30. The wireless communications device of claim 29, where the text window is associated with an application that differs from at least one of the first and the second applications.

31. The wireless communications device of claim 29, where the text window is associated with a virtual keyboard application.

32. The wireless communications device of claim 29, where the first location is associated with an application that displays a list of candidate Chinese characters, and where the text window is associated with one of a handwriting recognition application and a virtual keyboard application.

33. The wireless communications device of claim 28, where said control means is implemented in an integrated circuit.

* * * * *